(12) United States Patent
Chen et al.

(10) Patent No.: US 8,661,101 B2
(45) Date of Patent: Feb. 25, 2014

(54) METHOD OF IP ADDRESS DE-ALIASING

(75) Inventors: Fei Chen, Green Brook, NJ (US);
Lorraine Denby, Berkeley Heights, NJ (US); Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 627 days.

(21) Appl. No.: 12/130,202

(22) Filed: May 30, 2008

(65) Prior Publication Data

US 2008/0301271 A1  Dec. 4, 2008

Related U.S. Application Data

(60) Provisional application No. 60/941,645, filed on Jun. 1, 2007.

(51) Int. Cl.
*G06F 15/16* (2006.01)
*G06F 15/177* (2006.01)

(52) U.S. Cl.
USPC ............ 709/221; 709/206; 709/207; 709/217; 709/245

(58) Field of Classification Search
USPC .................. 709/220–222, 217; 370/474, 475, 370/351–414
See application file for complete search history.

(56) References Cited

U.S. PATENT DOCUMENTS

| | | | |
|---|---|---|---|
| 6,556,540 B1 * | 4/2003 | Mawhinney et al. ......... | 370/394 |
| 6,639,900 B1 * | 10/2003 | Anstey et al. ................. | 370/254 |
| 7,289,454 B2 * | 10/2007 | Bovo et al. .................... | 709/224 |
| 7,313,098 B2 * | 12/2007 | Bearden et al. ............... | 709/220 |
| 7,379,475 B2 * | 5/2008 | Minami et al. ................ | 709/250 |
| 7,689,686 B2 * | 3/2010 | Gunawardena et al. ...... | 709/224 |
| 2002/0049762 A1 * | 4/2002 | Shah et al. ..................... | 709/238 |
| 2002/0116154 A1 * | 8/2002 | Nowak et al. ................. | 702/186 |
| 2002/0198993 A1 * | 12/2002 | Cudd et al. .................... | 709/219 |
| 2003/0196148 A1 * | 10/2003 | Harrisville-Wolff et al. ... | 714/47 |
| 2003/0210698 A1 * | 11/2003 | Rouleau ........................ | 370/397 |
| 2004/0059830 A1 * | 3/2004 | Brown .......................... | 709/238 |
| 2004/0063438 A1 * | 4/2004 | Hsu et al. .................. | 455/452.1 |
| 2004/0210632 A1 * | 10/2004 | Carlson et al. ................ | 709/203 |
| 2005/0021737 A1 * | 1/2005 | Ellison et al. ................. | 709/224 |
| 2005/0123003 A1 * | 6/2005 | Bordonaro et al. ........... | 370/516 |
| 2006/0015596 A1 * | 1/2006 | Mar et al. ...................... | 709/222 |
| 2006/0159025 A1 * | 7/2006 | Abdo et al. ................... | 370/249 |
| 2006/0182034 A1 * | 8/2006 | Klinker et al. ................ | 370/238 |
| 2006/0253488 A1 * | 11/2006 | Akaiwa ......................... | 707/102 |
| 2007/0041386 A1 * | 2/2007 | Mar et al. ...................... | 709/223 |
| 2007/0101044 A1 * | 5/2007 | Sudheer ........................... | 711/3 |
| 2008/0155093 A1 * | 6/2008 | Dharmistan .................. | 709/224 |

(Continued)

OTHER PUBLICATIONS

Spring et al, "Measuring ISP Topologies with Rocketfuel", Proceedings of IEEE/ACM Transactions on Networking, vol. 12, Feb. 2004.*

(Continued)

*Primary Examiner* — Ian N Moore
*Assistant Examiner* — Jenee Alexander
(74) *Attorney, Agent, or Firm* — Muncy, Geissler, Olds & Lowe, P.C.

(57) ABSTRACT

A method of internet protocol (IP) address de-aliasing that involves obtaining IP addresses from devices in a network, pinging pairs of the IP addresses by sending packets to pairs of the IP addresses, obtaining ping response orders for the packets, and determining whether the pairs of IP addresses are aliases of the same network device based on the obtained ping response orders.

15 Claims, 9 Drawing Sheets

(56) References Cited

U.S. PATENT DOCUMENTS

2009/0274114 A1* 11/2009 Jun et al. .................. 370/328
2010/0011120 A1* 1/2010 Kommula .................. 709/235
2011/0122771 A1* 5/2011 Joshi ........................ 370/236

OTHER PUBLICATIONS

Gunes, M. H. and Sarac, K. "Resolving IP Aliases in Building Traceroute-Based Internet Maps", Proceedings of the 7th ACM SIGCOMM Conference on Internet Measurement, San Diego, California, USA 2007.

Gunes, M. H. and Sarac, K. "Importance of IP Alias Resolution in Sampling Internet Topologies," *Proc. IEEE Global Internet*, 2006.

Pansiot, J., and Grad, D., "On Routes and Multicast Trees in the Internet," ACM Computuer Communication Review, vol. 28, pp. 41-50, Jan. 1998.

Spring, N., Mahajan, R., and Wetherall, D., "Measuring ISP Topologies with Rocketfuel," Proceedings of IEEE/ACM Transactions on Networking, vol. 12, Feb. 2004.

Tangmunarunkit, H., Govindan, R., Jamin, S., Shenker, S., and Willinger, W., Network Topology Generators: Degree-Based vs. Structural*, ACM SIGCOMM Computer Communication Review vol. 32, Issue 4 (Oct. 2002).

Govindan, R., and Tangmunarunkit, H., "Heuristics for Internet Map Discovery," IEEE Infocom 2000, pp. 1371-1380, Tel Aviv, Israel, Mar. 2000.

Gunes, M. H. and Sarac, K. "Analytical IP Alias Resolution" *International Conference on Communication, General Symposium*, Jun. 2006.

* cited by examiner

Δ - Network Devices
O - Interfaces
_____ Links

Δ - Network Devices
O - Interfaces
_____ Links

Δ — Network Devices
O — Interfaces
_____ Links

Δ — Network Devices
O — Interfaces
_____ Links

METHOD OF IP ADDRESS DE-ALIASING

CROSS-REFERENCE TO RELATED APPLICATIONS

The present application claims the benefit of U.S. Provisional Patent Application No. 60/941,645, filed Jun. 1, 2007, the entire contents of which is hereby incorporated by reference.

FIELD OF THE INVENTION

The present invention is directed toward a method of IP address de-aliasing, and, more specifically, toward a method of IP address de-aliasing based on a relationship between a packet sending order and a packet return order of packets sent to pairs of the IP addresses.

BACKGROUND OF THE INVENTION

Knowledge of network topology is useful for network diagnostics, performance tuning and monitoring. One method of obtaining information about network topology is to use traceroute. However, traceroute creates a list of IP addresses that correspond to the interfaces of the routers used from source to destination. These routers have multiple interfaces and there is, a priori, no way to tell that two IP addresses are interfaces on the same router.

To illustrate the difference between a topology based on network interfaces and a topology based on devices we can compare FIG. 1 and FIG. 2. In FIG. 1, each node represents a network device while in FIG. 2, each node is a network interface. Network engineers often want to know about the topology of FIG. 1; however, FIG. 2 is of little use to the network engineer precisely because it does not incorporate the classification of interfaces by device.

Going from the topology of FIG. 2 to the more useful topology of FIG. 1 requires that the IP addresses observed in the traceroute results be classified according to the router to which they belong. The classification is known as IP de-aliasing. Errors in resolving such a conflict can affect the usefulness of the topology. The impact of such errors with respect to various essential network characteristics has been studied in works such as M. H. Gunes and K. Sarac "Importance of IP Alias Resolution in Sampling Internet Topologies," *Proc. IEEE Global Internet*, 2006. In addition, various approaches have been proposed to perform IP alias resolution. One of the earliest methods was introduced by J. Pansiot and D. Grad in "On Routes and Multicast Trees in the Internet," in *ACM Computer Communication Review*, volume 28, pages 41-50, January 1998. This method relied on the fact that when a router generates a packet for an ICMP port unreachable message, the message generally appears to come from the emitting interface rather than from the interface to which the original packet was sent. Extensions to this approach have been used in the Mercator project (R. Govindan and H. Tang-munarunkit, "Heuristics for Internet Map Discovery," in *IEEE INFOCOM* 2000, pages 1371-1380, Tel Aviv, Israel, March 2000) and in the Rocketfuel tool (N. Spring, R. Mahajan, and D. Wetherall, "Measuring ISP Topologies with Rocketfuel," in *Proceedings of IEEE/ACM Transactions on Networking*, volume 12, February 2004). Quite a different solution was suggested by M. H. Gunes and K. Sarac in "Analytical IP Alias Resolution," in *IEEE International Conference on Communication, General Symposium*, June 2006, to exploit common IP address assignment schemes. This latter method has the advantage of requiring much less probing than what the J. Pansiot paper described.

Standard methods for IP de-aliasing include DNS, SNMP and TELNET. Each of these methods, however, has shortcomings that render them difficult to apply consistently and automatically on a large network. SNMP and TELNET, for example, require the knowledge of device passwords. Even with the proper authentication, which might be possible to obtain on a private network, information uncovered by these methods is often entered by humans and thus potentially out-of-date or inaccurate. Another obstacle to using SNMP effectively is that there is no standard SNMP variable that uniquely identifies a device.

Alternative methods that do not suffer these shortcomings rely on data collected by endpoints distributed throughout a network. The idea behind these approaches is that an endpoint is a vantage from which a quantitative view of the network topology, made up of devices (and their associated IP addresses), can be obtained. This approach reveals device identities by considering how an endpoint interacts with the devices. Typical interactions include responses such as: 1) round trip times; 2) IP time stamps; 3) IP packet IDs; 4) IP Record Routes. If two IP addresses belong to the same device, then measurements taken at the same time from an endpoint to these two IP addresses should be similar in round trip time, identical in time stamps, sequential in packet ID values, and finally, IP Recorded Routes to the two IP address should be identical. Unfortunately, except for the first test, the rest of the tests all require strong assumptions about the network. For response 2, it must be the case that the network time protocol (NTP) is not running since it interferes with IP time stamps. For response 3 devices need to use sequentially increasing packet IDs on a per device basis, rather than on a per interface basis as many devices do. Response 4 is based on the assumption that network paths have less than 9 hops, because IP Record Route is limited to 9 hops.

It would therefore be desirable to provide a method for IP address de-aliasing that is useful on private networks, that does not require strong assumptions about the underlying network, and that can address the de-aliasing problem and provide an accurate representation of the topology of a network.

SUMMARY OF THE INVENTION

These problems and others are addressed by embodiments of the present invention, a first aspect of which comprises a method of internet protocol (IP) address de-aliasing that involves obtaining IP addresses from devices in a network and selecting a first pair of IP addresses, comprising a first IP address and a second IP address, from the obtained IP addresses. The method further involves pinging the first IP address and pinging the second IP address in a first order, and receiving a first ping response from the first IP address and receiving a second ping response from the second IP address. A second order is determined that comprises an order of the first and second ping responses. The pinging and receiving is repeated a plurality of times, and a relationship is determined between the first order and the second order. Whether the first and second IP addresses are aliases of the same network device is determined based on the relationship.

Another aspect of the present invention comprises a method of internet protocol (IP) address de-aliasing that includes obtaining IP addresses from devices in a network, pinging pairs of the IP addresses by sending packets to pairs of the IP addresses, obtaining ping response orders for the packets, and determining whether the pairs of IP addresses are aliases of the same network device based on the obtained ping response orders.

A further aspect of the invention comprises a computer readable recording medium storing instructions for causing a computer to obtain IP addresses from devices in a network, obtain ping response orders for packets sent to pairs of the IP addresses, and determine whether the pairs of IP addresses are aliases of the same network device based on the obtained ping response orders.

Still another aspect of the invention comprises a computer readable recording medium storing instructions for causing a computer to perform a method of a) obtaining IP addresses from devices in a network, b) selecting a first pair of IP addresses, comprising a first IP address and a second IP address, from the obtained IP addresses, c) pinging the first IP address and pinging the second IP address in a first order, d) receiving a first ping response from the first IP address and receiving a second ping response from the second IP address, e) determining a second order comprising an order of the first and second ping responses, f) repeating c-e a plurality of times, g) determining a relationship between the first order and the second order, and h) determining whether the first and second IP addresses are aliases of the same network device based on the relationship.

BRIEF DESCRIPTION OF THE DRAWINGS

These aspects of the invention and others will be better understood after a reading of the following detailed description in connection with the attached drawings wherein.

DETAILED DESCRIPTION

Figure 1:
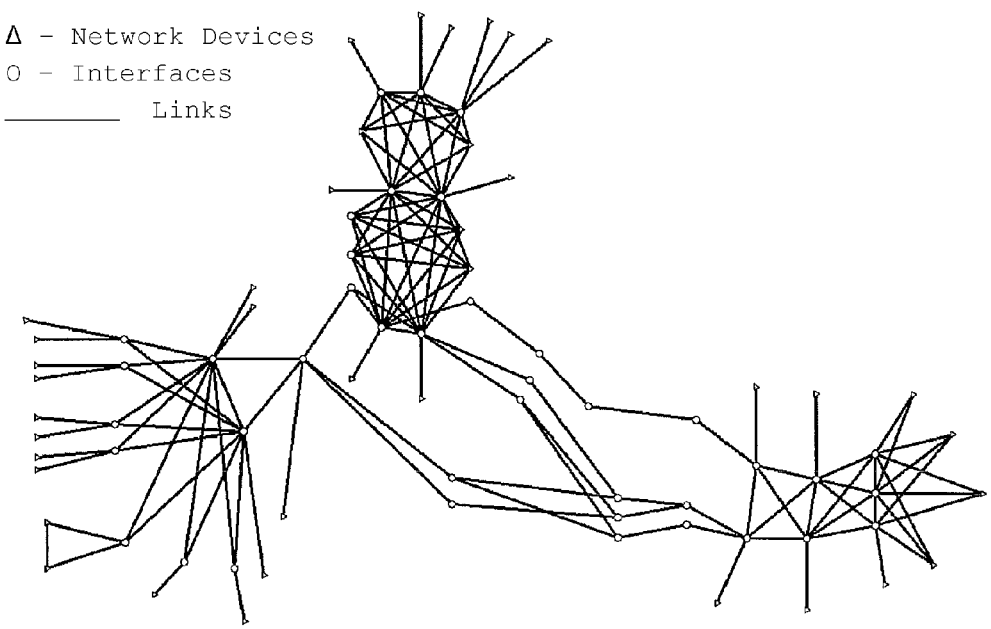
FIG. 1 is a graph of a first network and the connections between devices in the network developed from a physical examination of the network.

Reference is now made to the drawings, wherein the showings are for the purpose of illustrating presently preferred embodiments of the invention only and not for the purpose of limiting same. The below discussion is based on two networks. The first network is an actual corporate network illustrated in FIG. 1. This network comprised three LANs in three non-contiguous U.S. states that are separated by WAN links. The first network includes over 30 devices and at least 130 interfaces. Through close work with the IT staff of the corporation, and using a variety of methods, including SNMP and rlogin, it was possible to develop the graph of FIG. 1 which is believed to be a good, although likely not perfect, representation of the physical devices that make up the first network. Developing the graph of FIG. 1 require high-level access to all network devices and took more than a week of manual work to complete. As discussed below, even this graph is believed to contain some errors.

Figure 3:
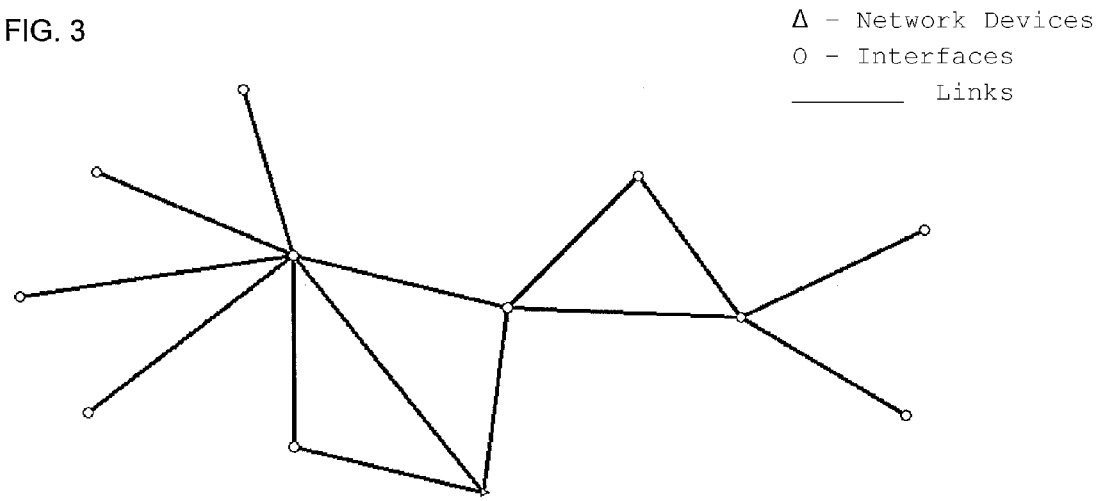
FIG. 3 is a graph of a second network and the connections between devices in the network developed from a physical examination of the network.
Figure 4:
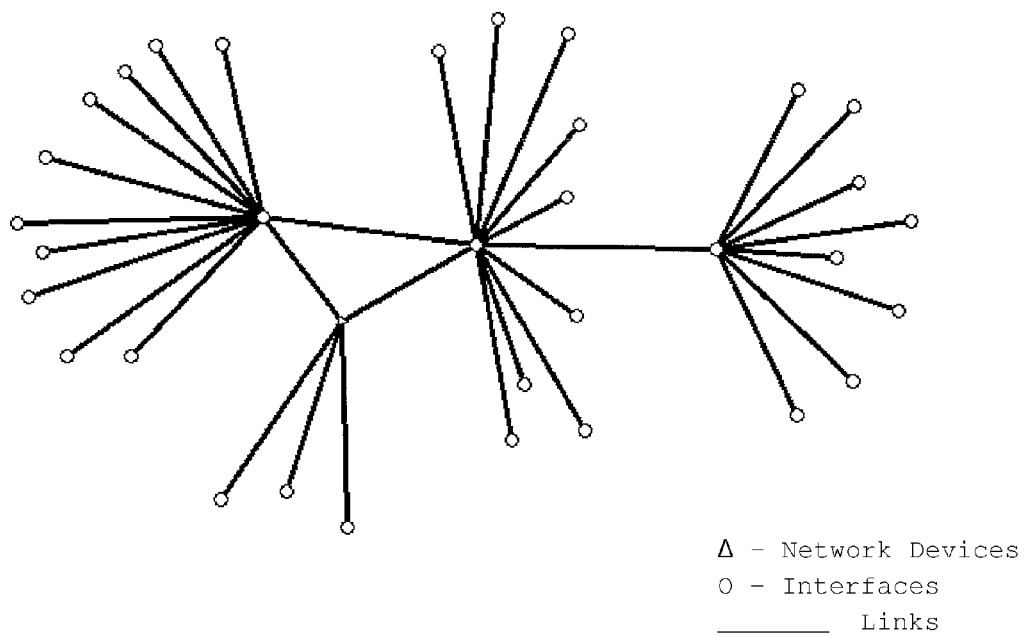
FIG. 4 is a graph of the second network and the connections between devices in the network based on traceroute data.

A second or "laboratory" network, was constructed expressly for testing the method disclosed herein. The physical structure of this network is illustrated in FIG. 3, and the structure of this network obtained using traceroute data is illustrated in FIG. 4. This second network comprises 12 devices (11 routers and 1 endpoint) with 34 interfaces/IP addresses (33 on routers and 1 on the endpoint). This network allowed the inventors to vary experimental parameters and helped to establish a baseline performance level, since the physical structure of the network is completely known and the test network had no congestion that could affect test results.

The method of an embodiment of the present invention is an automated way of obtaining accurate information about the physical structure of a network without the inaccuracies produced by the use of raw traceroute data and without the significant amount of physical labor required for a manual verification of the actual physical structure of a network.

Figure 5:
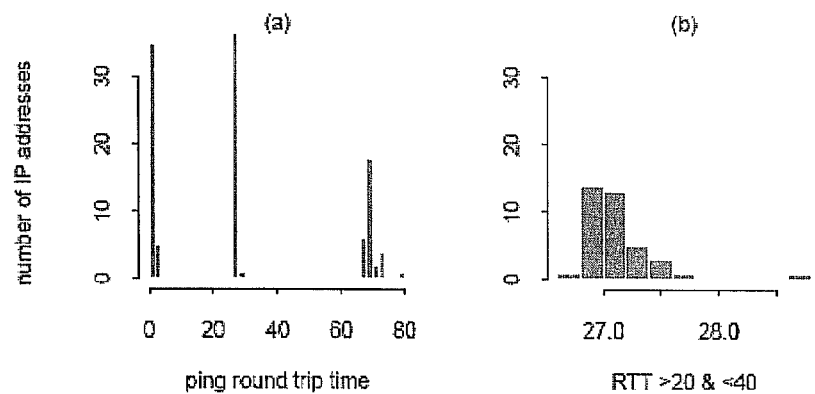
FIG. 5a is a graph illustrating ping round trip times for a plurality of IP addresses in the network of FIG. 1.
FIG. 5b is an expanded portion of the graph of FIG. 5a illustrating ping round trip times clustered around 27 milliseconds.

It is first noted that ping round trip time is a basic measurement that can be reliably obtained in most network environments. A straightforward method for IP de-aliasing would simply involve clustering round trip measurements into groups. This is in fact a very efficient and reliable strategy for grouping IP addresses coarsely into individual LANs. FIG. 5 illustrates this approach. It comprises a histogram of ping round trip times from an endpoint to all IP addresses on the first, corporate network of FIG. 1. FIG. 5a illustrates three distinct clusters. Checking against the physical structure of the network, it was confirmed that these clusters correctly identify the IP addresses in each of the three LANs. Zooming in on the middle cluster of round trip times in FIG. 5b, however, shows that ping round trip times are all quite similar for a given LAN, and this makes it nearly impossible to perform de-aliasing for the LAN on this basis alone.

Coarsely separating IP addresses into LANs in this manner, however, beneficially reduces the number of tests that are needed in carrying out the method according to an embodiment of the present invention we need to perform. With a set of n IP addresses, it is typically necessary to carry out C(n, 2) pair-wise tests for de-aliasing. By first bucketing the IP addresses into LANs of sizes $n_i$ (i is the LAN index), and then testing only pairs of addresses within a LAN, the number of tests is reduced to $\Sigma C$ $(n_i, 2)$. This reduction can be quite substantial.

After a network is coarsely divided into a number of separate LAN's, the IP addresses in each LAN are tested to determine which are aliases of the same device. Because devices in the LAN are connected via much faster links than the WAN links between the LAN's, IP alias resolution generally must be accomplished in some way other than a mere comparison of round trip ping times. The difficulty with relying on round trip ping times was illustrated in FIGS. 5a and 5b and is further illustrated in FIG. 6. This figure shows the result of pinging all 33 IP addresses on the second, laboratory network. Each dot in this figure represents the median round trip time of 1000 measurements to one of the IP addresses. In this plot the 33 addresses are grouped into 11 lines/devices (excluding the endpoint) since we know the physical construction of this network. As will be apparent, some of the dot clusters are quite spread out (e.g. 192.168.10.6 or 192.168.10.2), making it difficult to rationalize that these IP addresses reside on the same device. We also see some of the compact clusters are similar in value across different devices (e.g. 192.168.1.1 and 10.6.6.6 or 10.2.2.2 and 10.1.1.1), which could easily lead to the mistaken conclusion that these addresses are all part of the same alias.

The above figures show that it is not sufficient to compare ping round trip times directly for within LAN de-aliasing. Rather, one must also consider the manner in which IP addresses respond to the ping requests.

To this end, the present inventors propose a method of IP de-aliasing that involves testing pairs of the IP addresses to determine whether both addresses belong to the same network device. From an endpoint, each IP address of the pair of IP addresses is sent a ping packet. If these two IP addresses are aliased, then the ping packets are more likely to be returned in an order that is dependent on the order in which they were sent. The order may be the same as or opposite to the order in which they were sent. In contrast, if two IP addresses are not aliases of each other, the receiving order should be constant and independent of sending order. This is because network delay along paths to non-aliased addresses would be much greater than the effect of the small difference in the initial sending timing of the ping requests.

The method of an embodiment of the present invention involves a pair-wise test of sending m pairs of ping requests to two addresses, $ip_1$ and $ip_2$. The two packets within each pair are separated by d ms. Ideally, d will be equal to 0, i.e., the two packets are sent back-to-back with little or no separation. When d is greater than 0, as is often the case, an adjustment term is applied when determining whether the second packet to be sent arrived first or second. The adjustment term helps account for the "head start" that the first ping request receives in a device that cannot send first and second ping requests with no separation therebetween.

The adjustment term may be a constant related to a typical delay between sending two packets. For example, if the delay is determined to be 0.1 milliseconds, the response to the second ping request will be considered to arrive first if it arrives less than 0.1 milliseconds after the response to the first ping response. Alternately, the precise sending times of the first and second packets can be measured using a process such as kernel time stamping, discussed in detail in U.S. Pat. No. 7,313,098, the entire contents of which are hereby incorporated by reference. In such a case, the delay between the sending of the first ping request and the sending of the second ping request is readily calculated, and this known delay can be used as an adjustment term to remove the "head start" of the first ping request when determining which ping response was received first. Since d is either substantially equal to 0 or may be corrected to be substantially equal to 0, for ease of explanation the following discussion will treat d as being equal to 0. Packet ordering is randomized ($ip_1$, $ip_2$ or $ip_2$, $ip_1$). Subsequent test pairs are delayed by w ms to minimize device effects. The general metric of interest is the number of times ping replies are returned in the same order as requests were sent.

Figure 7:
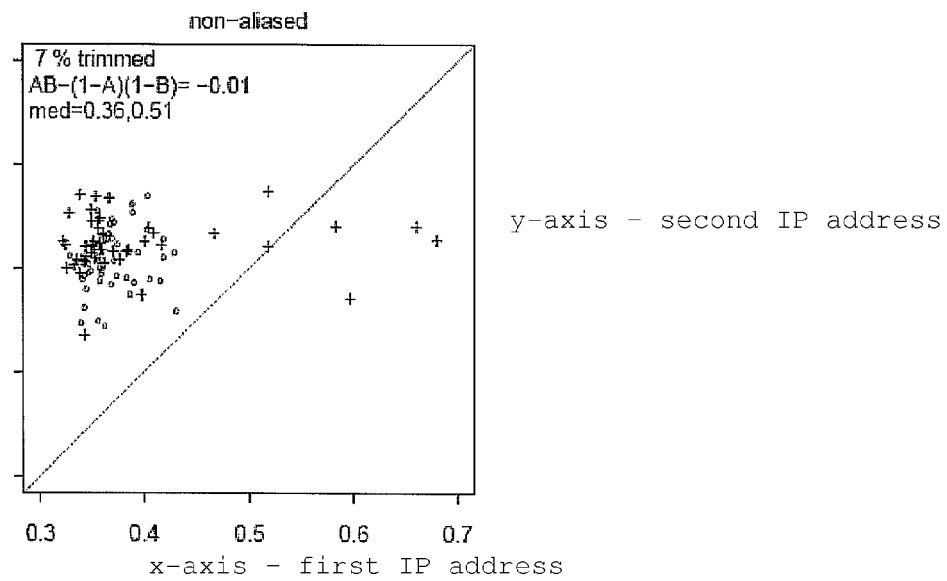
FIG. 7 illustrates a relationship between the order of ping transmissions and the order of ping returns for a pair of non-aliased IP addresses.
Figure 8:
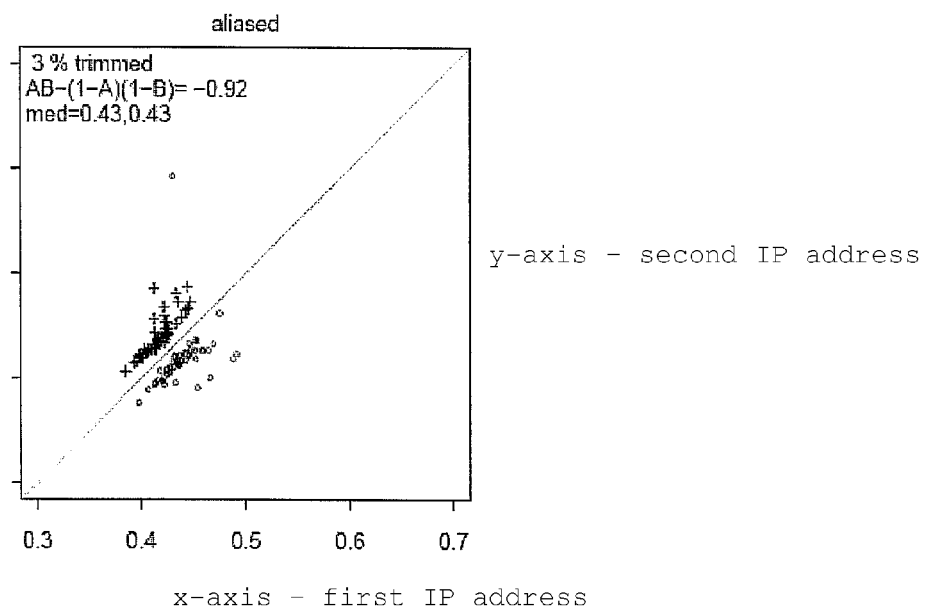
FIG. 8 illustrates a relationship between the order of ping transmissions and the order of ping returns for a pair of aliased IP addresses.

FIGS. 7 and 8 illustrate two scatter plots containing two sets of measurements. FIG. 7 shows packets being sent to a pair of IP addresses that are on two different devices and FIG. 8 shows packets being sent to a pair of addresses that are aliased. Each axis in each plot is associated with an IP address, and each point is the result of one pair-wise test. There are 50 points per plot, and the order in which the pairs of packets were sent is randomized. Thus twenty-five points had packets sent to the y-axis IP address first, and those are labeled with +. The points identified by circles represent packets that were sent to the x-axis IP address first. As these figures show, in FIG. 7, most of the points fall to the left of the diagonal line from (0,0) to (1, 1), meaning the ping packets to the x-axis address almost always come back sooner. The order in which the packets were sent had little or no effect on how the packets were received. This is a typical response from two non-aliased IPs.

In contrast, in FIG. 8, the sending order strongly influenced the receiving order for the two aliased addresses. The packets sent second tended to come back first. To see this, take a + point to the left of the diagonal line from the bottom plot. This point represents two ping round trip measurements from back-to-back packets sent to a pair of IP addresses. The first packet was sent to the IP address on the y-axis, and the second packet was sent to the IP address on the x-axis. Because this point lies to the left of the diagonal, its y-axis value, the ping round trip time to the y-axis IP address, is bigger than the time to x-axis IP address. Since smaller round trip time means faster response, the ping reply came back from the x-axis IP address first, before the reply to the packet sent to the y-axis IP address. The same argument, in the opposite direction, applies to the points identified with circles.

While the order of ping response was strongly related to the order in which the packets were sent, the packets sent second consistently came back first. This is somewhat counter-intuitive. One explanation may involve the subtleties of router operation: the second packet may return faster because the first packet has prepared the router for handling subsequent ping requests. In any event, the logic of test is well illustrated: if the order in which test packets are sent influences the order in which packets are received, it is likely that the IP addresses in the pair are aliased.

Many test statistics can be constructed based on m pair-wise round trip measurements, from simple correlations to distributional comparisons to tests of differences in regression coefficients. The inventors have developed the following statistic which is simple to calculate and which seems to accurately distinguish aliased from non-aliased addresses. To understand this approach, for an IP pair $ip_1$ and $ip_2$, let A be the percentage of packets that were sent to $ip_1$ first and that also came back first. Let B be percentage of packets that were sent to $ip_2$ first and that also came back first. It is then possible to define a statistic, "$S_{ABBA}$" as $ABBA = A \times B - (1-A) \times (1-B)$.

When $ip_1$ and $ip_2$ are on the same device, in the idealized case, the test packet sending order completely controls the order in which the packets are returned. Thus, A will equal 1 or B will equal 1, or, occasionally, these numbers will be reversed and A and B will both be equal to 0. Therefore, in the idealized case, $S_{ABBA}$ will always have a value of 1 or −1. When $ip_1$ and $ip_2$ are on separate devices, in the idealized case, packets sent to one address will nearly always return first, regardless of sending order, so A and B will have opposite values, either 0 and 1 or 1 and 0, respectively, producing a $S_{ABBA}$ of 0.

Figure 9:
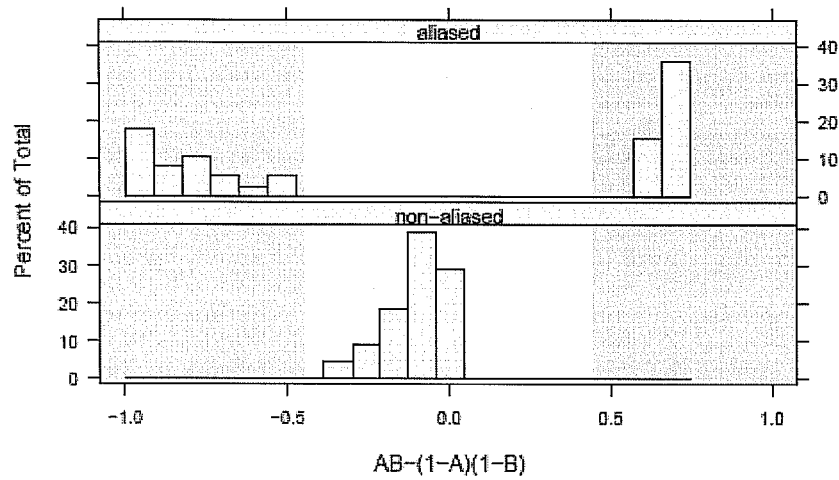
FIG. 9 illustrates a first statistical analysis of ping transmission order and ping response order based on tests performed on the laboratory network of FIG. 3.
Figure 10:
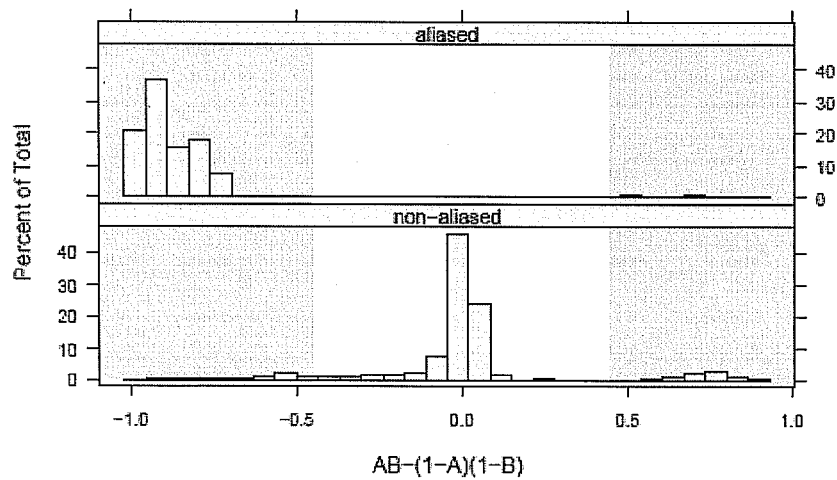
FIG. 10 illustrates a first statistical analysis of ping transmission order and ping response order based on tests performed on the corporate network of FIG. 1.
Figure 14:
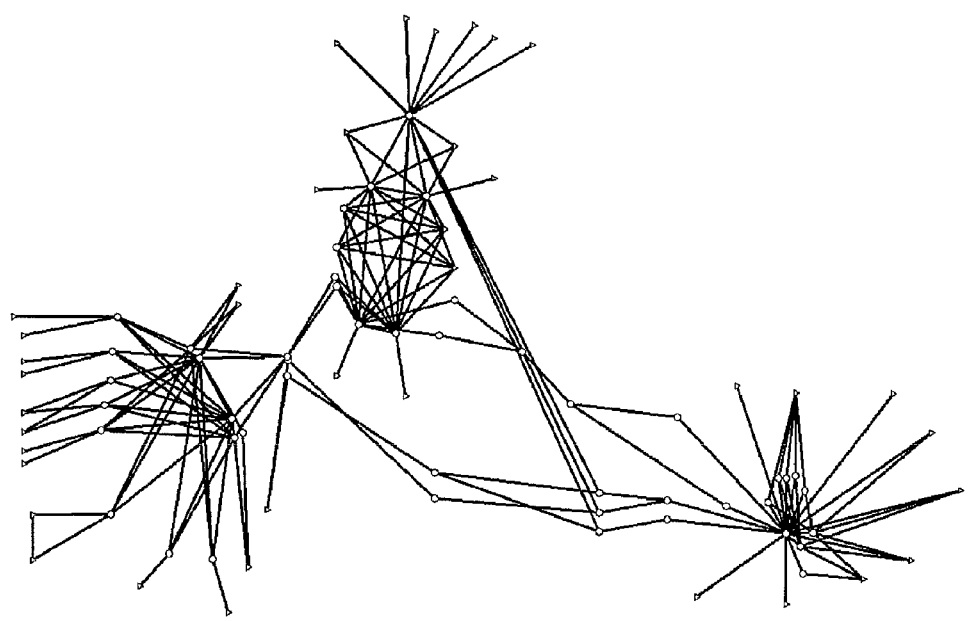
FIG. 14 is a graph of the apparent arrangement of devices and the connections therebetween in the first network of FIG. 1 based on data obtained using a method according to an embodiment of the present invention.

FIG. 9 shows that the $S_{ABBA}$ statistic, when applied to the laboratory network of FIGS. 3 and 4, cleanly separated the aliased IP pairs (the top panel of FIG. 9) from non-aliased ones (the bottom panel of FIG. 9), if we designate IP pairs falling into the band between −0.45 and 0.45 as non-aliased addresses. FIG. 10 is the result of the same test conducted on the corporate network of FIG. 1. Although the separation is not as complete as that on the laboratory network, it appears that few mistakes were made. The corporate network had over 100 IP addresses on three LANs, which produced about 1700 pair-wise tests. Furthermore, the true physical layout of the corporate network was not known with absolute certainty, since it was manually obtained through a variety of techniques and is likely to contain at least a few errors. The inventors suspect the lump near 1 in the bottom panel of FIG. 10 actually contains aliased IP pairs, even though the original examination of the network indicates otherwise. FIG. 14 illustrates the topology of the network of FIG. 1 based on the method described above. While not identical to the manually obtained topology of FIG. 1, this automated method provides a topology much closer to that of the physical network than the one obtained using traceroute data alone.

Figure 2:
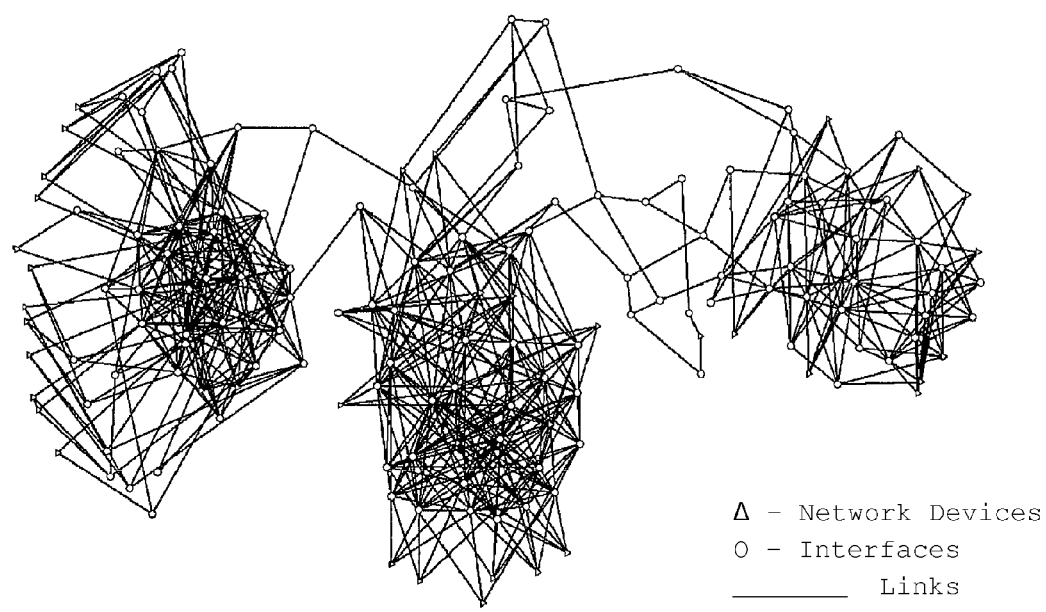
FIG. 2 is a graph of the apparent arrangement of devices and the connections therebetween in the first network of FIG. 1 based on traceroute data.
Figure 6:
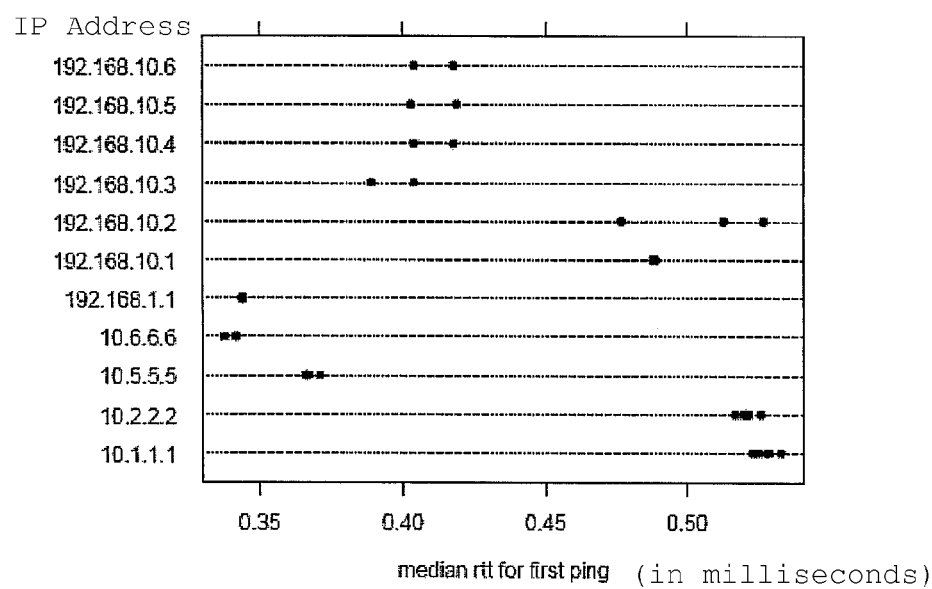
FIG. 6 illustrates clusters of median round trip times for pings to various IP addresses in the network of FIG. 3.

Several aspects of these results warrant further comments. There are two significant parameters that control how the tests were carried out. These are m, the number of pairs of ping packets delivered, and w, the delay in milliseconds between test-packets. For the corporate network of FIGS. 1 and 2, there are also network conditions to be considered. In FIGS. 6 and 7, m was set equal to 1000 and w was equal to 200 ms. These settings require long test cycle times, especially when the number of IP addresses is large. For example, it took about four days of testing on the corporate network to produce the information represented by FIG. 10. Furthermore, $S_{ABBA}$ is continuous between −1 and 1, so a decision rule is required to determine where aliased addresses end and non-aliased addresses begin. To find a setting that produced accurate results in an acceptably short test period, the inventors carried out extensive experiments on the lab network.

Figure 11:
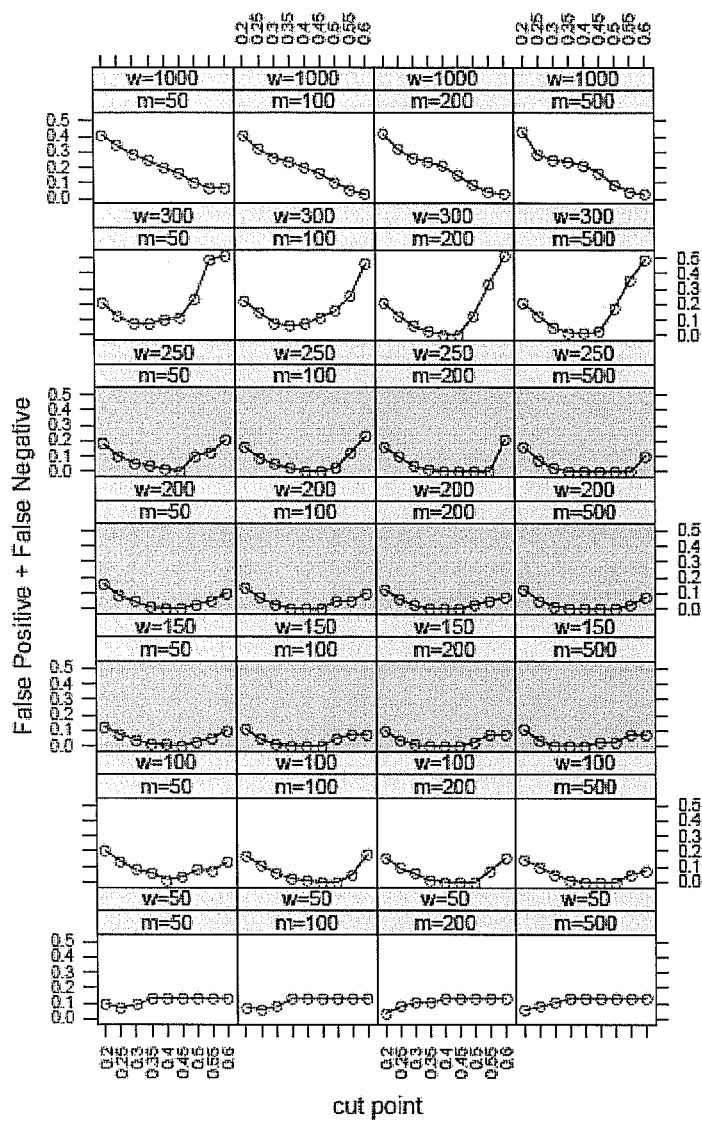
FIG. 11 illustrates an effect of the number of ping packets sent and the timing between the packets on error rates in determining whether a pair of packets is returned from aliased or non-aliased devices.

FIG. 11 provides empirical evidence for the set of optimal parameter settings. This figure illustrates the behavior of the sum of false positive and negative rates (percent aliased IP pairs incorrectly classified as percent not aliased plus non-aliased pairs incorrectly classified as aliased) against various values of cut points. An IP pair is considered aliased if $|S_{ABBA}|$>cut point. The other co-variates in this plot are w and m. Each panel corresponds to a different setting of w and m, the values of which are indicated in the strips above the panels. The panels are arranged so that each row shows results from a fixed value of w and each column has a fixed m value.

The panels representing best performance are in the third, fourth and fifth rows. From those panels, the inventors recommend a setting of w=200 ms and m=200 with a cut point about 0.45. These selections reduced the test cycle time on the corporate network to about 18 hours.

Figure 12:
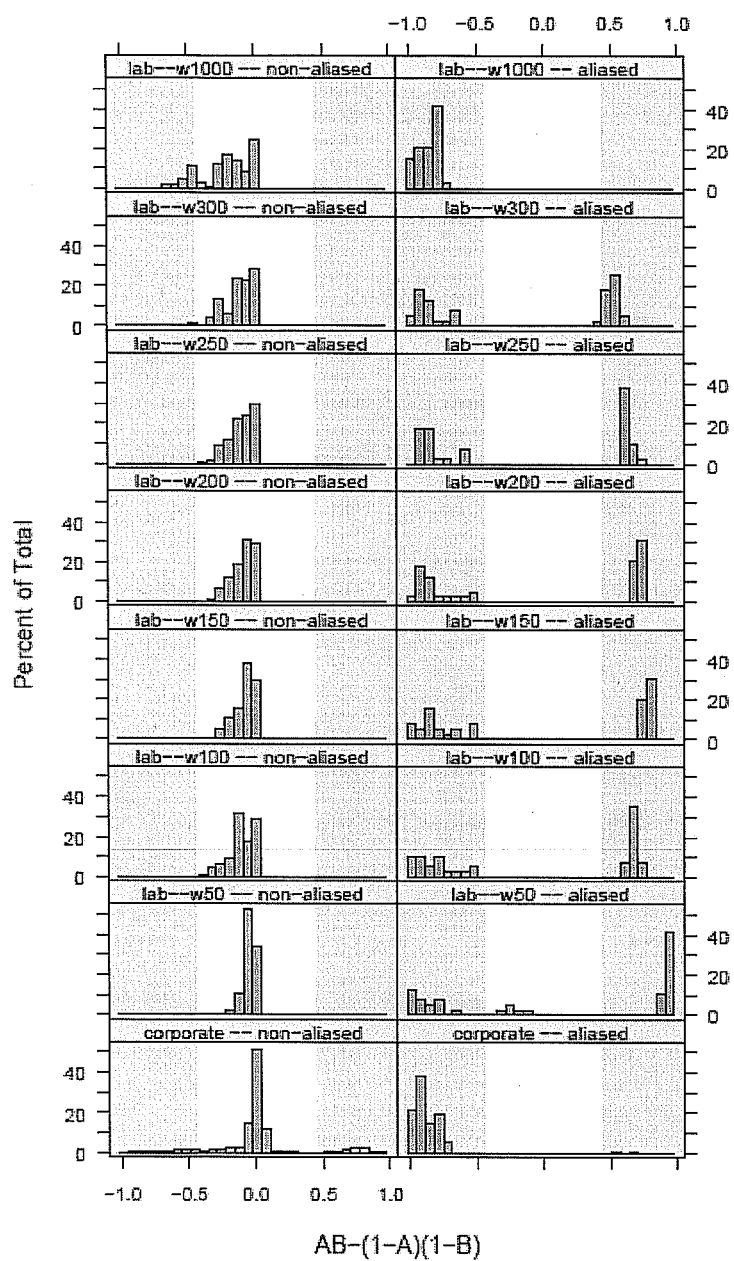
FIG. 12 illustrates the effects of the number of ping packets sent and the timing between the packets on error rates in both the laboratory network and the corporate network in determining whether a pair of packets is returned from aliased or non-aliased devices.

FIG. 12 provides a further comparison between the laboratory network and the corporate network for a cut-off point of 0.45 when different values of w are used. As noted above, w's of less than 1000 ms have little effect on classification error. FIG. 12 confirms that, with reasonable values of w, no errors occur on the lab network and very few errors seem to occur on the private network.

Figure 13:
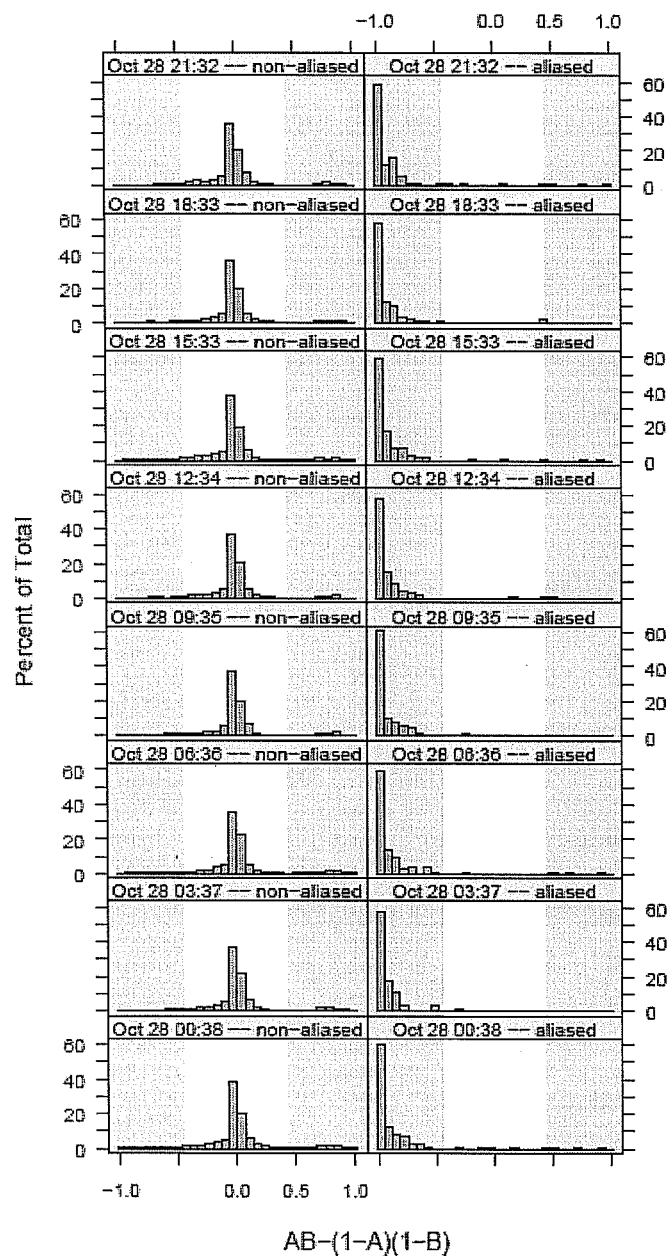
FIG. 13 illustrates the effects of network congestion on a method according to an embodiment of the present invention.

Finally, to study the effect of network conditions, we rely on time-of-day as a proxy for network congestion, assuming the corporate network carries more traffic during business hours. Network congestion had little effect on the accuracy of the disclosed test method, as evidenced by FIG. 13 which shows that $S_{ABBA}$ distribution remains stable and varies very little across different times of a day.

The present invention has been described herein in terms of a preferred embodiment. However, additions and variations to this embodiment will become apparent to those of ordinary skill in the relevant arts upon a reading of the foregoing description. It is intended that all such additions and variations comprise a part of the present invention to the extent they fall within the scope of the several claims appended hereto.

What is claimed is:

1. A method of internet protocol (IP) address de-aliasing comprising:
   a) obtaining IP addresses from devices in a network;
   b) selecting a first pair of IP addresses, comprising a first IP address and a second IP address, from the obtained IP addresses;
   c) pinging the first IP address and pinging the second IP address in a first order;
   d) receiving a first ping response from the first IP address and receiving a second ping response from the second IP address;
   e) determining a second order comprising an order of receipt of the first and second ping responses, wherein determining the second order comprises adjusting the second order to account for a delay between pinging the first IP address and pinging the second IP address;
   f) repeating c-e a plurality of times;
   g) determining a relationship between the first order and the second order; and
   h) determining whether the first and second IP addresses are aliases of the same network device based on the relationship.

2. The method of claim 1 wherein determining the second order also comprises determining that the second ping response is received first if the second ping response is received less than a predetermined time after the first ping response.

3. The method of claim 1 wherein the delay between pinging the first IP address and pinging the second IP address is determined by kernel timestamping the first ping request to obtain a first ping sending time and kernel timestamping the second ping request to obtain a second ping sending time and determining a difference between the first and second ping sending times.

4. The method of claim 1 wherein determining a relationship comprises determining whether the second order is affected by the first order.

5. The method of claim 1 wherein determining a relationship comprises identifying the first pair of IP addresses as aliases when the second order is dependent on the first order.

6. The method of claim 5 wherein determining a relationship comprises identifying the first pair of IP addresses as belonging to different devices when the second order is independent of the first order.

7. The method of claim 1 including:
   i) selecting a next pair of first and second IP addresses; and
   j) performing c-e a plurality of times for the first and second IP addresses of the next pair of IP addresses;

k) determining a relationship between the first order and the second order for the next pair of IP addresses; and l) determining whether the first and second IP addresses of the next pair of IP addresses are aliases of a single network device based on the relationship.

8. The method of claim 1 wherein pinging an IP address comprises sending a packet to the IP address and receiving a response and including determining a value A comprising a percentage of packets sent to the first IP address first that return first and a value B comprising a percentage of packets sent to the second IP address first that return first.

9. The method of claim 8 including determining a statistic S equal to $(A \times B) - [(1-A) \times (1-B)]$ and determining the first and second IP addresses to be aliases when S has a first set of values.

10. The method of claim 9 wherein said first set of values comprises the complement of $-0.45 < S < 0.45$.

11. The method of claim 1 including obtaining round-trip time measurements from an endpoint to the IP addresses in the network and forming at least first and second groups of IP addresses based on the round trip time measurements.

12. The method of claim 11 wherein said selecting a first pair of IP addresses comprises selecting a first pair of IP addresses from within the first group.

13. The method of claim 1, wherein determining a relationship comprises identifying the first pair of IP addresses as aliases when the second order is dependent on the first order, and wherein pinging an IP address comprises sending a packet to the IP address and receiving a response and including determining a value A comprising a percentage of packets sent to the first IP address first that return first and a value B comprising a percentage of packets sent to the second IP address first that return first.

14. A non-transitory computer readable recording medium storing instructions for causing a computer to perform a method of:

a) obtaining IP addresses from devices in a network;

b) selecting a first pair of IP addresses, comprising a first IP address and a second IP address, from the obtained IP addresses;

c) pinging the first IP address and pinging the second IP address in a first order;

d) receiving a first ping response from the first IP address and receiving a second ping response from the second IP address;

e) determining a second order comprising an order of receipt of the first and second ping responses, wherein determining the second order comprises adjusting the second order to account for a delay between pinging the first IP address and pinging the second IP address;

f) repeating c-e a plurality of times;

g) determining a relationship between the first order and the second order; and h) determining whether the first and second IP addresses are aliases of the same network device based on the relationship.

15. The non-transitory computer readable recording medium of claim 14 wherein determining the second order also includes determining a time delay d between pinging the first IP address and pinging the second IP address and determining the second ping response to be received before the first ping response if the second ping response is received less than the time d after the first ping response.

* * * * *